United States Patent

[11] 3,619,162

| [72] | Inventors | Herman Pottgiesser;<br>Karl Heinz Zapp, both of Ludwigshafen, Germany |
|---|---|---|
| [21] | Appl. No. | 813,749 |
| [22] | Filed | Apr. 4, 1969 |
| [45] | Patented | Nov. 9, 1971 |
| [73] | Assignee | Badische Anilin- & Soda-Fabrik Aktiengesellschaft<br>Ludwigshafen am Rhine, Germany |
| [32] | Priority | Apr. 5, 1968 |
| [33] | | Germany |
| [31] | | P 17 67 140.8 |

[54] PRODUCTION OF AND APPLICATION TO SOIL SUSPENSION FERTILIZERS FROM NITRIC ACID SOLUTIONS OF PHOSPHATE ROCK
6 Claims, No Drawings

| [52] | U.S. Cl. | 71/37, 71/39, 71/43, 71/64 C |
|---|---|---|
| [51] | Int. Cl. | C05b 11/06, C05b 11/12 |
| [50] | Field of Search | 71/39, 64 C, 37, 43, 34 |

[56] References Cited
UNITED STATES PATENTS

| 2,555,656 | 6/1951 | Plusje et al. | 71/43 X |
| 2,738,265 | 3/1956 | Nielsson | 71/43 X |
| 2,845,340 | 7/1958 | Kanbe et al. | 71/39 |
| 2,861,878 | 11/1958 | Bigot | 71/39 |
| 3,052,384 | 8/1962 | Bigot | 71/39 |
| 3,092,487 | 6/1963 | Nevo-Hucohen | 71/39 X |
| 3,416,910 | 12/1968 | Legal et al. | 71/39 |

FOREIGN PATENTS

| 541,353 | 5/1957 | Canada | 71/39 |
| 391,495 | 10/1930 | Great Britain | 71/39 |
| 1,487,876 | 5/1967 | France | 71/39 |

Primary Examiner—Reuben Friedman
Assistant Examiner—Richard Barnes
Attorney—Johnston, Root, O'Keeffe, Keil, Thompson & Schurtleff ABSTRACT: To prepare suspension fertilizers from nitric acid solutions of phosphate rock the solutions are neutralized in an already neutralized solution in a vessel by means of ammonia and/or an ammonium salt of carbonic or carbamic acid, a pH of from seven to 10 and a temperature of from 10° to 50° C. being maintained. During or immediately after the neutralization, substances containing carbonate ions and/or forming carbonate ions in solution are introduced. The finished suspension should have a $CO_3^{--}$ content of at least 0.2 percent by weight.

PRODUCTION OF AND APPLICATION TO SOIL SUSPENSION FERTILIZERS FROM NITRIC ACID SOLUTIONS OF PHOSPHATE ROCK

The present invention relates to production of and application to soil of suspension fertilizers and in particular relates to the production of and application to soil of such suspension fertilizers.

Clear liquid fertilizer solutions and suspension fertilizers which contain solids as well as the solute have recently gained increasing importance as compared with conventional solid and granular fertilizers. They have the advantage over solid fertilizers that evaporation and granulation are not necessary in their production, that they are more easily handled and that they cannot agglomerate They do however have a number of disadvantages. In particular, they have a lower nutrient content than solid fertilizers and this has an undesirable effect on transport costs. In the case of some suspension fertilizers there is also the risk that the solids may settle to such an extent in the course of time that they can only be stirred up again with difficulty.

Various methods are already known for the production of suspension fertilizers. It is known for example that fertilizer suspensions can be obtained by treating with ammonia a phosphoric acid which has been obtained by a wet method. The phosphoric acid is neutralized with ammonia, a gelatinous composition being formed. When this is cooled, ammonium phosphate is precipitated in finely divided form owing to supersaturation. In storage, crystal growth of the originally finely divided water-soluble ammonium phosphate crystals occurs. This results in rapid sedimentation of the suspension so that the deposited crystals agglomerate. The suspension cannot be regenerated by stirring.

It is also known that solutions obtained by treating phosphate rock with nitric acid can be used for the production of suspension fertilizers. Fertilizer suspensions obtained in this way have however a number of disadvantages which it has not been possible to overcome hitherto. The neutralization of the solutions with gas or liquids containing ammonia, for example ammonium carbonate, cannot be carried to a $NH_3 : HNO_3$ ratio of more than 0.65:1 without having to take into account a loss of plant available $P_2O_5$, i.e. citrate-soluble $P_2O_5$. Ammoniation can be taken further without this disadvantage by adding sulfuric acid to the solution prior to the neutralization. This has the disadvantage however that insoluble calcium sulfate is formed which sediments rapidly. For this reason it is necessary to add suspension stabilizers. Various compounds, particularly argillaceous compounds, have been proposed as stabilizers.

A process for the production of suspension fertilizers has been described in French Pat. No. 1,487,876. It consists in separating from nitric acid solutions by cooling prior to neutralization, such an amount of the calcium nitrate as calcium nitrate tetrahydrate that in the remaining mother liquor there is a weight ratio of $P_2O_5$:caO of at least 1.2:1, the remaining mother liquor being introduced together with the neutralizing agent with vigorous stirring into a previously neutralized solution while maintaining a pH of from 6 to 8 at a temperature of from 10° to 70° C. Other nutrient substances may then be added if desired. Suspensions prepared in this way have good stability in storage, i.e. the solids settle out only slowly. The process is only applicable however to solutions containing nitric acid in which prior to neutralization a $P_2O_5$:CaO ratio of at least 1.2:1 has been set up by separation of calcium nitrate tetrahydrate.

The present invention has for its object to prepare stable suspension fertilizers which have high ammonium citrate solubility even in prolonged storage starting from nitric acid solutions of phosphate rock and without the separation of calcium nitrate tetrahydrate, i.e. from nitric acid solutions of phosphate rock in which the ratio of $P_2O_5$:CaO is less than 1.2:1.

We have found that this object is achieved in the production of suspension fertilizers from nitric acid solutions of phosphate rock by neutralizing the solutions in a previously prepared already neutralized solution by (a) maintaining a pH of from 7 to 10 and a temperature of from 10° to 50° C. during the neutralization in the already neutralized solution; (b) neutralizing the solution with ammonium salts of carbonic or carbamic acid or with ammonia and (c) when carrying out neutralization of the suspension with ammonia adding substances which are soluble in the suspension and which contain and/or form carbonate ions in the suspension, the $CO_3('')$ content of the suspension after the neutralization being at least 0.2 percent by weight.

Neutralization may be carried out in known manner with ammonia, and in accordance with this invention the substances containing carbonate ions and/or forming carbonate ions in the suspension are added during or immediately after the neutralization.

Examples of substances containing carbonate ions which are soluble in the suspensions and/or substances which form carbonate ions in the suspensions are ammonium carbonate, ammonium bicarbonate and ammonium carbamate which at the same time act as neutralizing agents, and also carbon dioxide. Not only pure carbon dioxide but also gas containing the same, for example offgas from the synthesis of urea of melamine, which contains ammonia as well as carbon dioxide, may be used. When solid substances are used as the source of carbonate ions, they may be added to the suspensions in dissolved or in solid form. Addition of the substances in accordance with this invention results in stabile suspensions which only settle slightly even in prolonged storage. The carbonate ions are advantageously added during the neutralization of the acid solution together with the neutralizing agent. It is also possible however to add the substances immediately after the neutralization without the quality of the suspension being substantially impaired as regards storability and citrate solubility, although they should not be introduced more than one hour later.

As already stated, ammonium salts of carbonic acid or carbamic acid, namely ammonium carbonate, ammonium bicarbonate or ammonium carbamate in solid form or in the form of their aqueous solutions may be used as neutralizing agents instead of ammonia; carbonate ions are thus introduced into the solution during neutralization. The $P_2O_5$ fraction which is soluble in ammoniacal and neutral ammonium citrate solution achieves values of more than 98percent which only decline to a trivial extent even in prolonged storage. This effect can be achieved even with amounts of carbonate ions as low as 0.2 percent by weight. There is practically no upper limit to the amount of carbonate ions added but as a rule from about 0.5 to 10 percent by weight of carbonate ions is used.

It is of decisive importance that the neutralization of the phosphate rock solution should take place at a high pH or in other words that the neutralizing agent should not be introduced into the acid solution being neutralized (as in the production of solid fertilizers) in such a way that the pH, starting from the pH of the acid solution, changes continually to the desired neutralization point. It is not possible by the said method to prepare stable suspension fertilizers having a high and constant citrate solubility. At the same time it is important that a temperature of 50° C. should not be exceeded during the neutralization because at higher temperatures it is not possible to obtain stable suspensions.

It is advantageous to use a pH range of from 8 to 9 and a temperature range of from 30° to 40° C.

NP suspensions prepared according to this invention may be mixed with other fertilizer components, for example urea or potassium chloride. To prepare a NP suspension high in nitrogen it is particularly advantageous to carry out the neutralization of the nitric acid solution with ammonium carbonate solution with the simultaneous addition of urea. A solution of urea and ammonium carbonate may also be used. The presence of urea favors the solubility of the salts so that at the same viscosity of the NP suspension more salts are dissolved and higher contents of nutrient can be achieved The following Examples illustrate the invention.

EXAMPLE 1

A. 100 parts by weight of pebble phosphate is acidulated with 200 parts by weight of 55 percent by weight nitric acid. The solution contains 8.1 percent by weight of nitrate nitrogen, 10.8 percent by weight of $P_2O_5$ and 15.7 percent by weight of CaO. This solution is introduced while stirring vigorously into such an amount of 25 percent by weight ammonia water at 30° C. that a pH of 8 is set up. The resultant suspension has the following composition:

|  | % by weight |
|---|---|
| CaO | 10.3 |
| $P_2O_5$ | 7.1 |
| $NO_3$-nitrogen | 5.3 |
| $NH_3$-nitrogen | 6.8. |

40 percent of the $P_2O_5$ fraction is soluble in alkaline ammonium citrate solution, 100 percent in neutral ammonium citrate solution and 1 percent in water.

(b) 1 liter of the neutralized solution described under (A) is placed in a vessel having a capacity of 3 liters and provided with an overflow, and at a constant temperature of 30° C. and a constant pH of 8 25 liters of nitric acid solution which has not been neutralized and 41 liters of a 45 percent by weight ammonium carbonate solution are added in the course of eight hours with vigorous stirring. The NP suspension has the following composition in percent by weight:

| total nitrogen |  |
|---|---|
|  | 11.8 |
| $NH_3$-nitrogen | 7.9 |
| $NO_3$-nitrogen | 3.9 |
| $P_2O_5$ | 5.2 |
| CaO | 7.6 |
| $CO_3^{(ii)}$ | 2.9 |

98 percent (96 percent) of the $P_2O_5$ content is soluble in alkaline ammonium citrate solution, 99 percent (98 percent) in neutral ammonium citrate solution and less than 1 percent (less than 1 percent) in water. The values in parentheses are the solubilities after storage for three months.

EXAMPLE 2

1 liter of the neutralized solution has introduced into it as described in example 1 under otherwise identical conditions 25 liters of the acid solution and 56 liters of a solution which contains 30 percent by weight of urea, 30 percent by weight of ammonium carbonate and 40 percent by weight of water simultaneously and continuously in the course of eight hours. A NP suspension is obtained having the following composition in percent by weight:

| total nitrogen |  |
|---|---|
|  | 18.4 |
| amide nitrogen | 9.4 |
| $NH_3$-nitrogen | 6.0 |
| $NO_3$-nitrogen | 3.0 |
| $P_2O_5$ | 4.0 |
| CaO | 5.8 |
| $CO_3^{(ii)}$ | 6.2 |

The $P_2O_5$ content is soluble to the extent of 98 percent (97 percent) in alkaline ammonium citrate solution, 99 percent (97 percent) in neutral ammonium citrate solution and less than 1 percent (less than 1 percent) in water. The values in parentheses indicate the solubilities after storage for three months.

EXAMPLE 3

In the manner described in example 1 25 liters of the acid solution is continuously introduced together with 34.4 liters of 25 percent aqueous ammonia solution into 1 liter of the neutralized solution. The NP suspension formed has the following composition in percent by weight:

| total nitrogen |  |
|---|---|
|  | 13.5 |
| $NH_3$-nitrogen | 9.0 |
| $NO_3$-nitrogen | 4.5 |
| $P_2O_5$ | 6.0 |
| CaO | 8.7 |

The suspension, immediately after it has been prepared, has a solubility in alkaline ammonium citrate solution of 98 percent, in neutral ammonium citrate solution of 99 percent and less than 1 percent in water.

These values fall in the course of three months to 35 percent, 96 percent and less than 1 percent.

If about 7.5 percent of ammonium carbonate is stirred into the NP suspension immediately after it has been prepared however, these solubility values are 95 percent, 98 percent and less than 1 percent.

This clearly illustrates the effect of the added carbonate.

We claim:

1. In a process for the production and application of a suspension fertilizer from an acidic solution resulting from acidulation of phosphate rock with nitric acid by adding the said solution to a solution thereof which has been previously neutralized and neutralizing the whole, the improvement which comprises maintaining during the addition of said acidic solution a pH of from 7 to 10 and a temperature of from 10° to 50° C. in the addition mixture and neutralizing the said addition mixture by adding thereto along with said acidic solution an ammonium salt of carbonic acid or carbamic acid or with ammonia and when neutralizing with ammonia adding a substance which contains carbonate ions and is soluble in the suspension or a substance which forms carbonate ions in the suspension, the $CO_3$-content of the suspension after neutralization being at least 0.2 percent by weight, and applying said suspension fertilizer to soil.

2. A process as claimed in claim 1 wherein the substance containing carbonate ions or forming carbonate ions is added in such an amount that the $CO_3^{(ii)}$ content of the finished suspension is from 0.2 to 10 percent by weight.

3. A process as claimed in claim 1 wherein the said percentage is from 0.5 to 10 percent by weight.

4. A process as claimed in claim 1 wherein the substance which forms carbonate ions or contains carbonate ions is added to the suspension immediately after neutralization with ammonia.

5. A process as claimed in claim 1 carried out at pH of from 8 to 9.

6. A process as claimed in claim 1 carried out at a temperature of from 30° to 40° C.

UNITED STATES PATENT OFFICE
CERTIFICATE OF CORRECTION

Patent No. 3,619,162  Dated November 9, 1971

Inventor(s) Hermann Pottgiesser and Karl Heinz Zapp

It is certified that error appears in the above-identified patent and that said Letters Patent are hereby corrected as shown below:

First page, left-hand column, in the title, "SOIL" should read -- SOIL OF --; right-hand column, in the references, "3,052,384" should read -- 3,050,384 --.

Column 1, line 1, "SOIL" should read -- SOIL OF --; line 55, "caO" should read -- CaO --.

Column 2, line 8, "$CO_3$ ($^{11}$)" should read -- $CO_3$ (--) --.

Column 3, lines 11 to 17, the table should read

-- 
| | % by weight |
|---|---|
| CaO | 10.3 |
| $P_2O_5$ | 7.1 |
| $NO_3$-nitrogen | 5.3 |
| $NH_3$-nitrogen | 6.8 |

--; lines 30 to 43, the table should read

-- 
| total nitrogen | 11.8 |
|---|---|
| $NH_3$-nitrogen | 7.9 |
| $NO_3$-nitrogen | 3.9 |
| $P_2O_5$ | 5.2 |
| CaO | 7.6 |
| $CO_3^{(--)}$ | 2.9 |

--; lines 60 to 75, and Column 4, lines 1 to 4, the table should read -- total nitrogen    18.4   --.
       amide nitrogen      9.4
       $NH_3$-nitrogen     6.0
       $NO_3$-nitrogen     3.0
       $P_2O_5$            4.0
       CaO                 5.8
       $CO_3^{(--)}$       6.2

Column 4, lines 18 to 27, the table should read
-- total nitrogen    13.5    --; line 58, claim 2, "$CO_3^{(11)}$"
                                  should read -- $CO_3^{(--)}$ --.
   $NH_3$-nitrogen   9.0
   $NO_3$-nitrogen   4.5
   $P_2O_5$          6.0
   CaO               8.7

Signed and sealed this 2nd day of May 1972.

(SEAL)
Attest:

EDWARD M. FLETCHER, JR.                ROBERT GOTTSCHALK
Attesting Officer                      Commissioner of Patents